US012575486B2

(12) United States Patent
Hiraki et al.

(10) Patent No.: US 12,575,486 B2
(45) Date of Patent: Mar. 17, 2026

(54) ROBOTIC WORKING APPARATUS

(71) Applicant: YAMABIKO CORPORATION, Tokyo (JP)

(72) Inventors: Hidenori Hiraki, Tokyo (JP); Koichi Nakatsugi, Tokyo (JP); Yoshiharu Koshikawa, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 965 days.

(21) Appl. No.: 17/717,798

(22) Filed: Apr. 11, 2022

(65) Prior Publication Data

US 2022/0338409 A1     Oct. 27, 2022

(30) Foreign Application Priority Data

Apr. 27, 2021     (JP) ................................. 2021-074975

(51) Int. Cl.
| | |
|---|---|
| *A01D 34/00* | (2006.01) |
| *A01D 101/00* | (2006.01) |
| *G05D 1/00* | (2024.01) |

(52) U.S. Cl.
CPC ......... *A01D 34/008* (2013.01); *G05D 1/0219* (2013.01); *G05D 1/0225* (2013.01); *A01D 2101/00* (2013.01)

(58) Field of Classification Search
CPC ............. A01D 34/008; A01D 2101/00; G05D 1/0219; G05D 1/0225; G05D 1/0282
See application file for complete search history.

(56) References Cited

U.S. PATENT DOCUMENTS

| | | | |
|---|---|---|---|
| 9,538,702 B2 | 1/2017 | Balutis et al. | |
| 11,442,448 B2 * | 9/2022 | He ........................ | G05D 1/0214 |
| 2014/0324246 A1 | 10/2014 | Biber et al. | |
| 2018/0074508 A1 * | 3/2018 | Kleiner ............... | G05D 1/6482 |

(Continued)

FOREIGN PATENT DOCUMENTS

| | | | | |
|---|---|---|---|---|
| EP | 3778145 A1 * | 2/2021 | .............. | B25J 11/00 |
| JP | H07-203706 A | 8/1995 | | |

(Continued)

OTHER PUBLICATIONS

Machine translation (Year: 2017).*

(Continued)

*Primary Examiner* — Scott A Browne
*Assistant Examiner* — Lidia Kwiatkowska
(74) *Attorney, Agent, or Firm* — BACON&THOMAS,PLLC

(57) ABSTRACT

A robotic working apparatus includes: a working tool configured to perform work on a field; a working robot configured to perform the work while autonomously traveling on the field; and a processor configured to set a traveling route for the working robot and control motion of the working robot In a case where a first area and a second area are set on the field as working areas of the working robot, when the working robot moves from a work end point in the first area to a work start point in the second area, the processor sets a route from the work end point to a base, and a route from the base to the work start point, which are different at least in part from one another.

11 Claims, 14 Drawing Sheets

(56)  References Cited

U.S. PATENT DOCUMENTS

2021/0084812 A1\*  3/2021  Matus .................. A01D 34/008

FOREIGN PATENT DOCUMENTS

| JP | 5973608 B1 | 8/2016 |
| JP | 2016-207158 A | 12/2016 |

OTHER PUBLICATIONS

Japanese Office Action cited in corresponding International Appln.
No. 2021-074975 dated Sep. 30, 2024 with machine translation.
EESR cited in corresponding International Appln. No. 22169814.5
dated Sep. 28, 2022.

\* cited by examiner

ROBOTIC WORKING APPARATUS

CROSS-REFERENCE TO RELATED APPLICATIONS

The present application claims priority from Japanese Patent Application No. 2021-074975 filed on Apr. 27, 2021, and the entire contents of which are hereby incorporated by reference.

BACKGROUND

1. Technical Field

The present invention relates to a robotic working apparatus configured to perform work while autonomously traveling on a field.

2. Related Art

Conventionally, there has been known a working robot configured to perform work such as lawn mowing along a traveling route while autonomously traveling in a working area, which is disclosed, for example, in Japanese Patent No. 5973608. The entire contents of the disclosure are hereby incorporated by reference. According to this related art, the working area is divided into a plurality of areas via virtual borders previously designated by a user to set a preferential working area in the working area, and a machine is autonomously traveled in the set preferential working area to perform the work.

In addition, there has been known a robotic lawn mower configured to move between a plurality of areas along traveling routes set between the plurality of areas, which is disclosed, for example, in U.S. Pat. No. 9,538,702. The entire contents of the disclosure are hereby incorporated by reference.

SUMMARY

The invention provides a robotic working apparatus including: a working tool configured to perform work on a field; a working robot configured to perform the work while autonomously traveling on the field; a processor configured to set a traveling route for the working robot and control motion of the working robot; and a memory configured to be able to communicate with the processor. In a case where a first area and a second area are set on the field as working areas of the working robot, when the working robot moves from a work end point in the first area to a work start point in the second area, the processor sets a route from the work end point to a base, and a route from the base to the work start point. The route from the work end point to the base is different at least in part from the route from the base to the work start point.

DETAILED DESCRIPTION

With the related art disclosed in JP5973608, after the work is done in one preferential working area, the machine is moved to another area of the plurality of divided areas, and the work is performed in this area. Then, when the remaining amount of a battery of the machine is equal to or lower than a set value and therefore the battery needs to be charged, the machine is returned to a charging base. However, this conventional art does not specifically describe how to travel between the areas.

In addition, with the related art disclosed in U.S. Pat. No. 9,538,702, when the robotic lawn mower moves between a plurality of areas, a traveling route from the work end point in the first area to the work start point in the second area is set. Therefore, when the battery needs to be charged on the way, a shuttle route is set to shuttle from the origin of the traveling route toward the second area to the charging base. In this case, the traveling routes overlap on the shuttle route, and this causes a problem that the damage of the field becomes worse due to the tire marks of the machine traveling on the traveling routes.

The present invention is proposed to address the above-described problems. It is therefore an object of the invention to provide a robotic working apparatus capable of reducing the damage of the field by eliminating the overlap between the traveling routes as much as possible, and capable of allowing efficient movement between a plurality of areas even taking into account the charging of the battery.

Hereinafter, an embodiment of the present invention will be described with reference to the drawings. The same basic numbers in the different drawings indicate the same functional sections, and therefore repeated description for each of the drawings is omitted.

Figure 1:
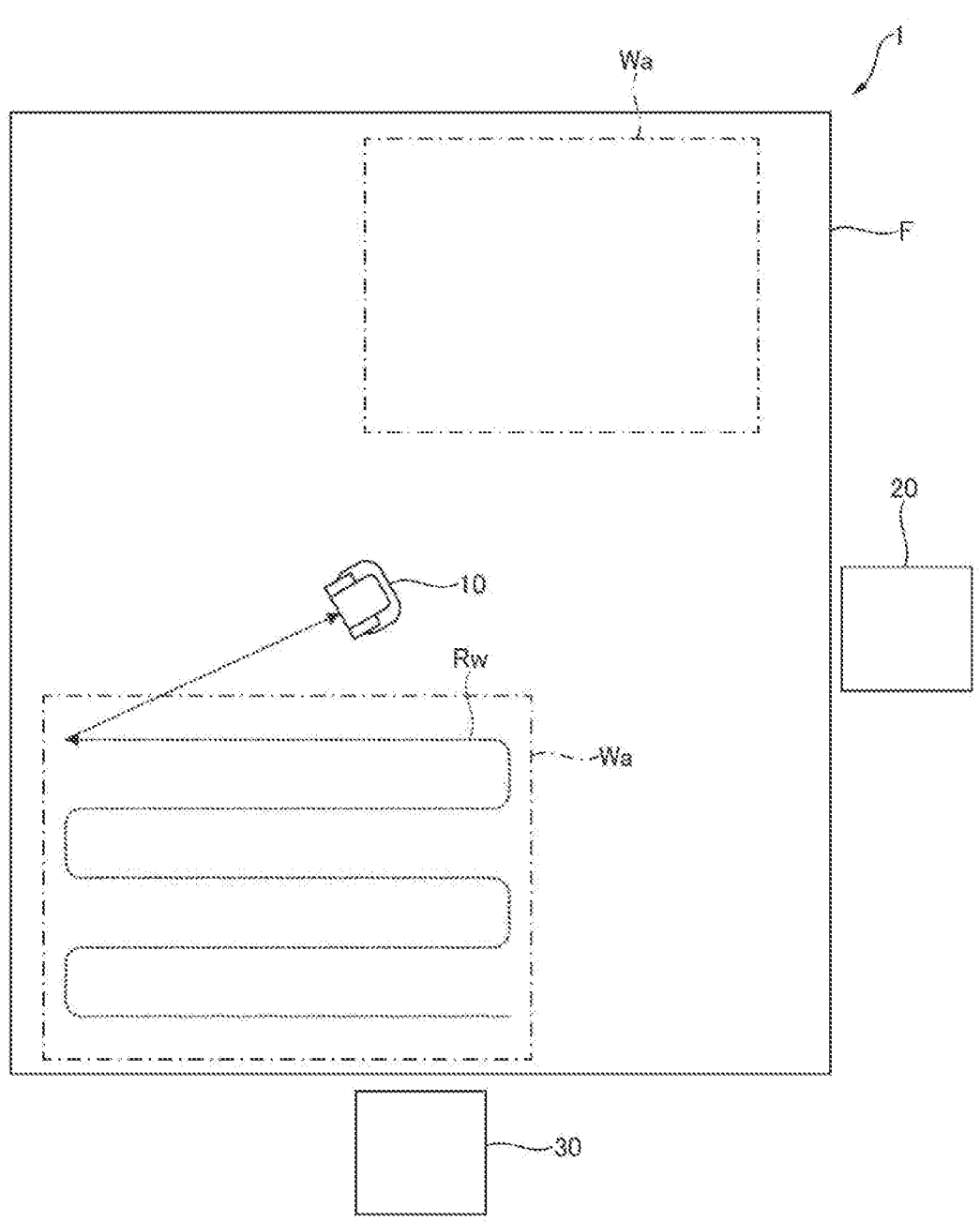
FIG. 1 illustrates a robotic working apparatus including a field and a base.

As illustrated in FIG. 1, a robotic working apparatus 1 includes a working robot 10 configured to perform work on a field F. The working robot 10 includes a working tool described later to perform work on the field F, and performs work while autonomously traveling on the field F. The work performed by the working robot 10 is not limited but may be, for example, mowing work, collection work, and cleaning work.

The robotic working apparatus 1 includes a base 20 for the field F. The base 20 may be provided in the field F, and may be provided outside the field F as illustrated. The base 20 is, for example, a charging base for the electric working robot 10, and is a discharge place where collected target objects are discharged when the working robot 10 performs the collection work.

In addition, the robotic working apparatus 1 includes a management device 30 as needed. The management device 30 is configured to remotely control the working robot 10, but may be omitted when the working robot 10 is operated by its own controller, or when the base 20 also serves as a management device to remotely control the working robot 10. The management device 30 may be provided in the field F, or in a facility outside and adjacent to the field F.

The robotic working apparatus 1 sets working areas Wa for the working robot 10 on the field F. The working robot 10 performs work while autonomously traveling in the set working areas Wa. As illustrated in FIG. 1, when a plurality of working areas Wa are set, the working robot 10 completes the work in one working area Wa, and then moves to a different working area Wa. Here, the working areas Wa may be set on the system as virtual areas based on position information, but may be set as physical areas in the field F by using wire, a marker, or a beacon.

In the working area Wa, the working robot 10 travels along a set traveling route or travels randomly in any direction to travel in the whole working area Wa and performs work. The traveling route Rw set in the working area Wa is not limited to the straight route as illustrated, but any route may be set.

Figure 2:
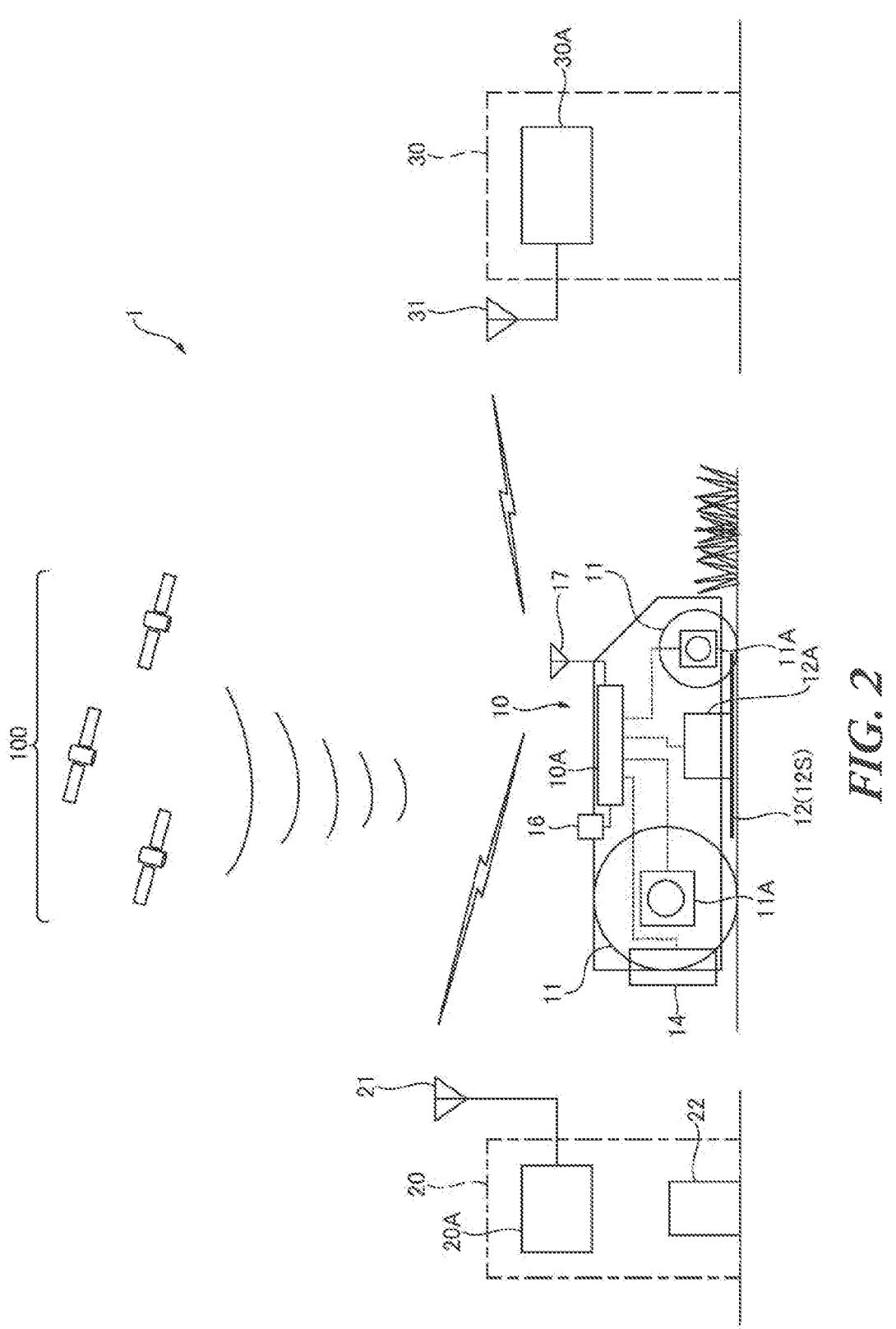
FIG. 2 illustrates an example of the configuration of the robotic working apparatus where a working robot performs mowing work.
Figure 3:
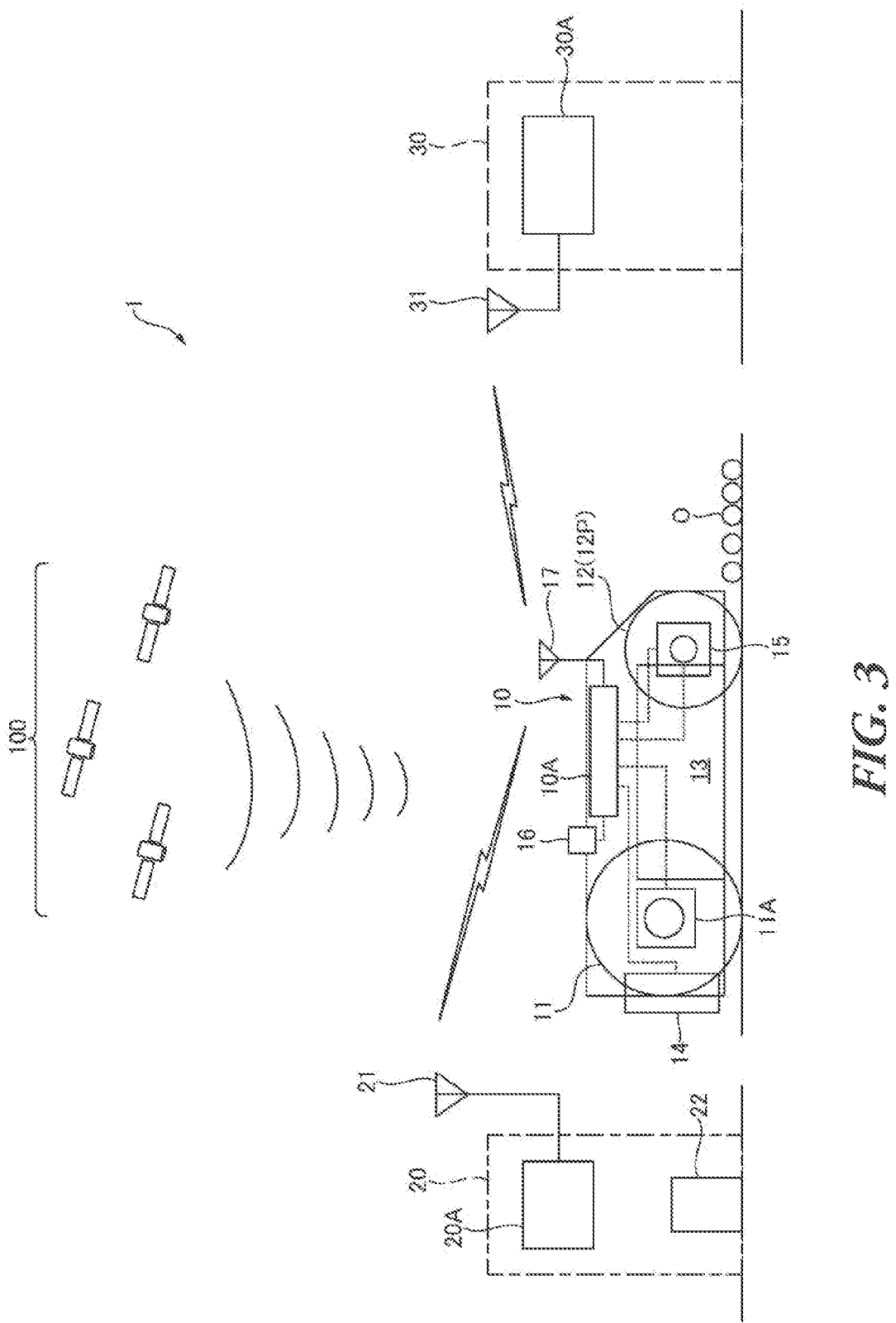
FIG. 3 illustrates an example of the configuration of the robotic working apparatus where the working robot performs collection work.

FIG. 2 and FIG. 3 illustrate examples of the configuration of the robotic working apparatus 1. The working robot 10 includes: a traveling part 11 having wheels to travel on the field F; a working tool 12 configured to perform work on the field F; a traveling drive part (motor) 11A configured to drive the traveling part 11; a working drive part (motor) 12A configured to drive the working tool 12; a controller (CPU: Central Processing Unit; Processor) 10A configured to control the operation of the traveling drive part 11A and the operation of the working drive part 12A; and a battery 14 as a power source of the working robot 10.

The traveling part 11 includes right and left traveling wheels, and the traveling drive part 11A is controlled to individually drive the wheels. By this means, the working robot 10 can move forward and backward, turn right and left, and steer in any direction.

With an example illustrated in FIG. 2, the working tool 12 of the working robot 10 is a blade device 12S for mowing on the field F. The blade device 12S is rotated or linearly reciprocated by the working drive part 12A to mow grass on the field F.

In addition, the working robot 10 includes a position detector 16 for the autonomous travel. As an example of the position detector 16, a GNSS (global navigation satellite system) sensor configured to receive radio signals sent from satellites 100 of a GNSS system such as a GPS, or a receiver configured to receive radio waves generated by beacons disposed in or around the field F may be used. Here, there may be a plurality of position detectors 16.

To achieve the autonomous travel of the working robot 10, the position detected by the position detector 16 is inputted to the controller 10A, and the controller 10A controls the traveling drive part 11A such that the position of the set traveling route matches the detected position, or the detected position is within the set area Wa.

The working robot 10 includes a communication part 17 configured to transmit and receive information to and from other devices as needed. By using the communication part 17, the working robot 10 transmits and receives the information to and from, for example, a management device 30 installed in a facility, and a controller 20A of the base 20. In addition, the working robot 10 can transmit and receive the information to and from other working robots deployed on the field F.

The management device 30 is a computer provided in the facility, or a server connected to a network, and includes a communication part 31 configured to transmit and receive the information to and from the communication part 17 of the working robot 10. The base 20 includes the controller 20A and a charging device 22 configured to charge the battery 14.

The controller 20A includes a communication part 21 configured to transmit and receive the information to and from the communication part 17 of the working robot 10. The communication parts 17, 21, and 31 can communicate with each other directly or via a network. Here, when the controller 10A of the working robot 10 independently performs the processing for the control, the communication parts 17, 21, and 31, and the management device 30 may be omitted. The controller 20A of the base 20 may also serve as the management device 30.

FIG. 3 illustrates an example where the working robot 10 includes a collection device 12P as the working tool 12 configured to pick up target objects O and put them into an accommodation part 13. With this example, one or each of the collection device 12P and the accommodation part 13 includes a measurement part 15 configured to measure the amount of the collected target objects O. The measurement part 15 may be a counter configured to count the quantity of the target objects O picked up by the collection device 12P, a scale configured to measure the quantity or the weight of the target objects O accommodated in the accommodation part 13, or a load meter configured to measure the work load of the working tool 12. The information measured by the measurement part 15 is inputted to the controller 10A. The other components of the working robot 10 illustrated in FIG. 3 are the same as those of the example illustrated in FIG. 2.

Figure 4:
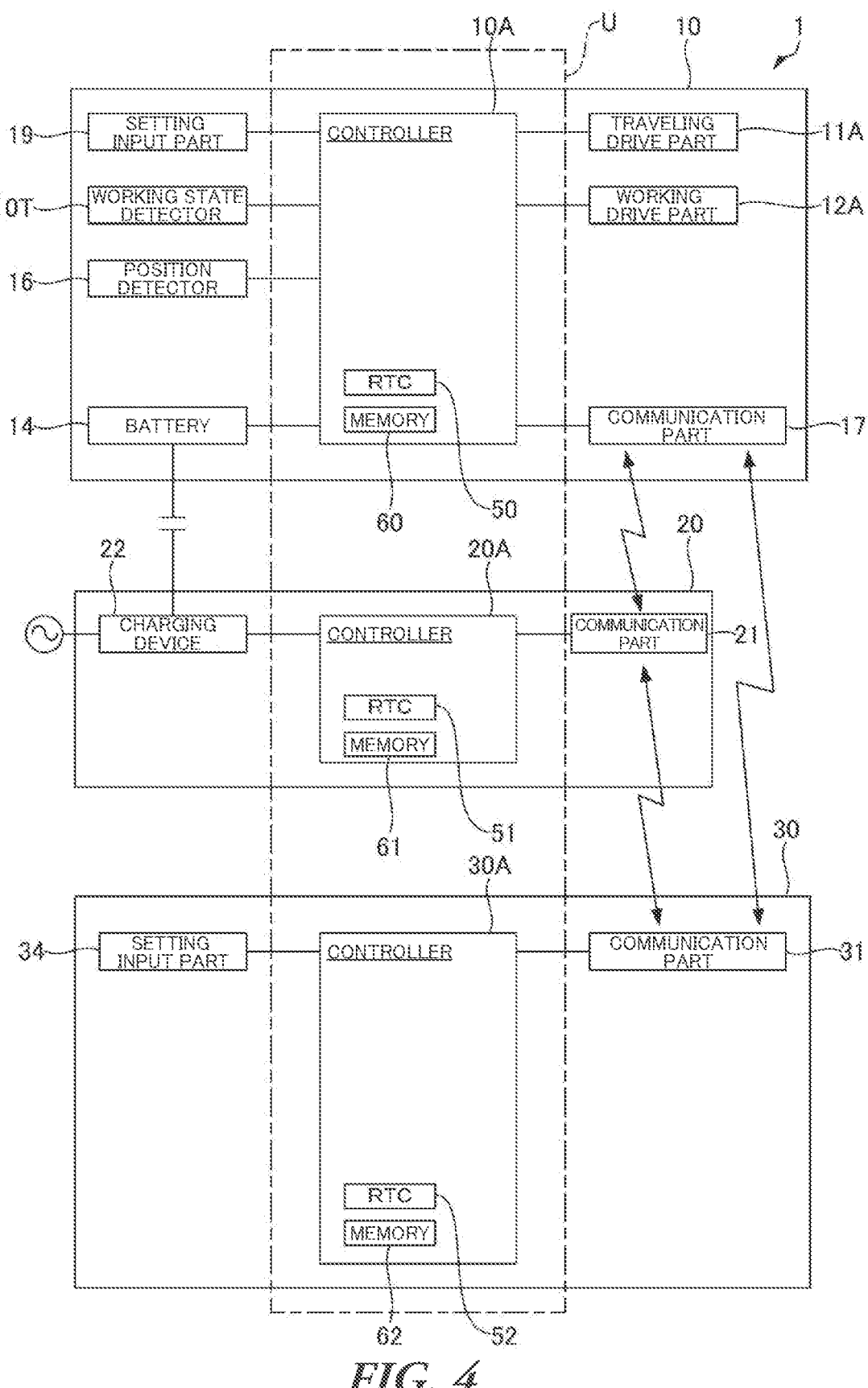
FIG. 4 illustrates the system configuration of the robotic working apparatus.

FIG. 4 illustrates an example of the system configuration of the robotic working apparatus 1. The controller 10A of the working robot 10 transmits and receives information via the communication part 17 as described above, and a controller (CPU) 30A of the management device 30 transmits and receives information via the communication part 31. In addition, a controller (CPU) 20A of the base 20 transmits and receives information via the communication part 21.

The controllers 10A, 20A and 30A include timers 50, 51, and 52 such as real-time clocks configured to measure and output the time, and memories 60, 61, and 62 configured to store information and programs, respectively. In addition, the controllers 10A, 20A, and 30A constitute a controller U which is unified by the exchange of information among the communication parts 17, 21, and 31, and the functions of the controllers 10A, 20A and 30A can be substituted for each other.

The controller 10A of the working robot 10 receives work instruction information (the existing work schedule, the working area, and the traveling route) from a setting input part 19, receives information from a working state detector 10T, receives information about the current position of the working robot 10 from the position detector 16, and receives information about the remaining amount of the battery from the battery 14. Then, the controller 10A controls the traveling drive part 11A and the working drive part 12A based on the inputted information, and performs the work of the working robot 10 according to the inputted work instruction information.

When the working tool 12 is the blade device 12S, the working state detector 10T is configured to detect the drive state of the load on a blade. Meanwhile, when the working tool 12 is the collection device 12P, the working state detector 10T is configured to detect the information about the amount of the collected target objects O from the measurement part 15.

The controller 20A provided in the base 20 receives charging process information and so forth from the charging device 22 charging the battery 14 of the working robot 10.

The controller 30A of the management device 30 receives work instruction information (the work schedule, the working area, and the traveling route) and management facility information (business hours, users, use places, the state of the field F, information about the growth of plants on the field F, the amount of feed of the target objects O, events of the management facility, and event times) from a setting input part 34.

Figure 5:
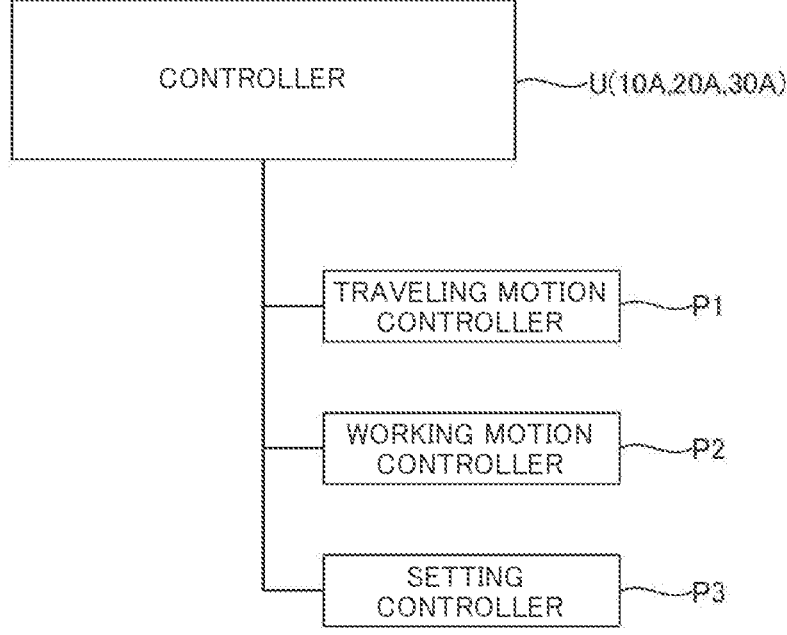
FIG. 5 illustrates a controller of the robotic working apparatus.

As illustrated in FIG. 5, the controller U (10A, 20A, and 30A) of the robotic working apparatus 1 includes a traveling motion controller P1 to control the autonomous travel of the traveling part 11 (traveling drive part 11A), a working motion controller P2 to control the motion of the working tool 12 (working drive part 12A), and a setting controller P3 to set the traveling route of the working robot 10. Here, the traveling motion controller P1, the working motion controller P2 and the setting controller P3 are programs to control the operation of the CPU of the controller U (10A, 20A, and 30A).

Hereinafter, examples of the setting of traveling routes by the controller U (10A, 20A, and 30A) will be described with reference to FIG. 6 to FIG. 14. Here, through FIG. 6 to FIG. 14, a first area Wa(1) and a second area Wa(2) are set as a plurality of working areas, and traveling routes for the working robots 10 are set to move from a work end point G1 in the first area Wa(1) to a work start point G2 in the second area Wa(2).

In this case, a traveling route to move from the work end point G1 in the first area Wa(1) directly to the work start point G2 in the second area Wa(2) is not set, but a traveling route from the work end point G1 to the base 20, and a traveling route from the base 20 to the work start point G2 are set. By this means, in a case where the working robot 10 completes the work for the first area Wa(1) and then goes to the second area Wa(2), the working robot 10 can return to the base 20 once and be charged. Therefore, it is possible to prevent run out of charge during the work for the second area Wa(2), and consequently to perform efficient work.

The traveling route from the work end point G1 to the base 20 is set to be different at least in part from the traveling route from the base 20 to the work start point G2. By this means, it is possible to eliminate the overlap between the traveling route to return to the base 20 and the traveling route from the base 20 to go to the working area Wa as much as possible, and therefore to reduce the damage of the field F due to the tire marks of the working robot 10.

Here, each of the traveling route from the work end point G1 to the base 20 and the traveling route from the base 20 to the work start point G2 may be a straight route or a non-straight route. In addition, each of the traveling route from the work end point G1 to the base 20 and the traveling route from the base 20 to the work start point G2 may be a direct route or a route with a relay point.

Figure 6:
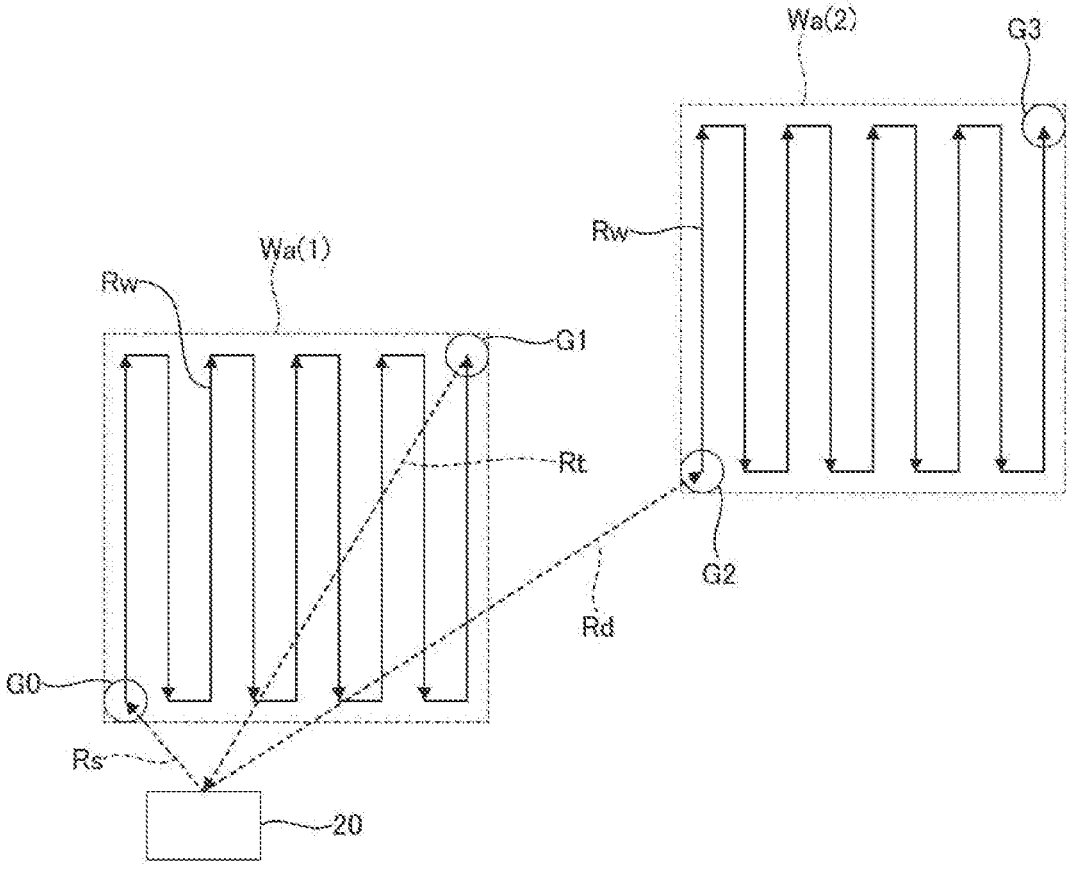
FIG. 6 illustrates an example of the setting of traveling routes by the controller of the robotic working apparatus.

With the example illustrated in FIG. 6, a traveling route Rw for work is set in each of the first area Wa(1) and the second area Wa(2). Here, the traveling routes Rw are set for patterned traveling, and with the illustrated example, are formed in a stripe pattern in which straight and parallel lines are alternately inversed. The traveling route Rw in the first area Wa(1) is a route from a work start point G0 to the work end point G1. The traveling route Rw in the second area Wa(2) is a route from the work start point G2 to a work end point G3.

In addition, a traveling route Rs from the base 20 to the work start point G0 in the first area Wa(1), a traveling route Rt from the work end point G1 in the first area Wa(1) to the base 20, and a traveling route Rd from the base 20 to the work start point G2 in the second area Wa(2) are set not to overlap each other. With the example illustrated in FIG. 6, each of the traveling routes Rs, Rt, and Rd is a direct and straight route.

Figure 7:
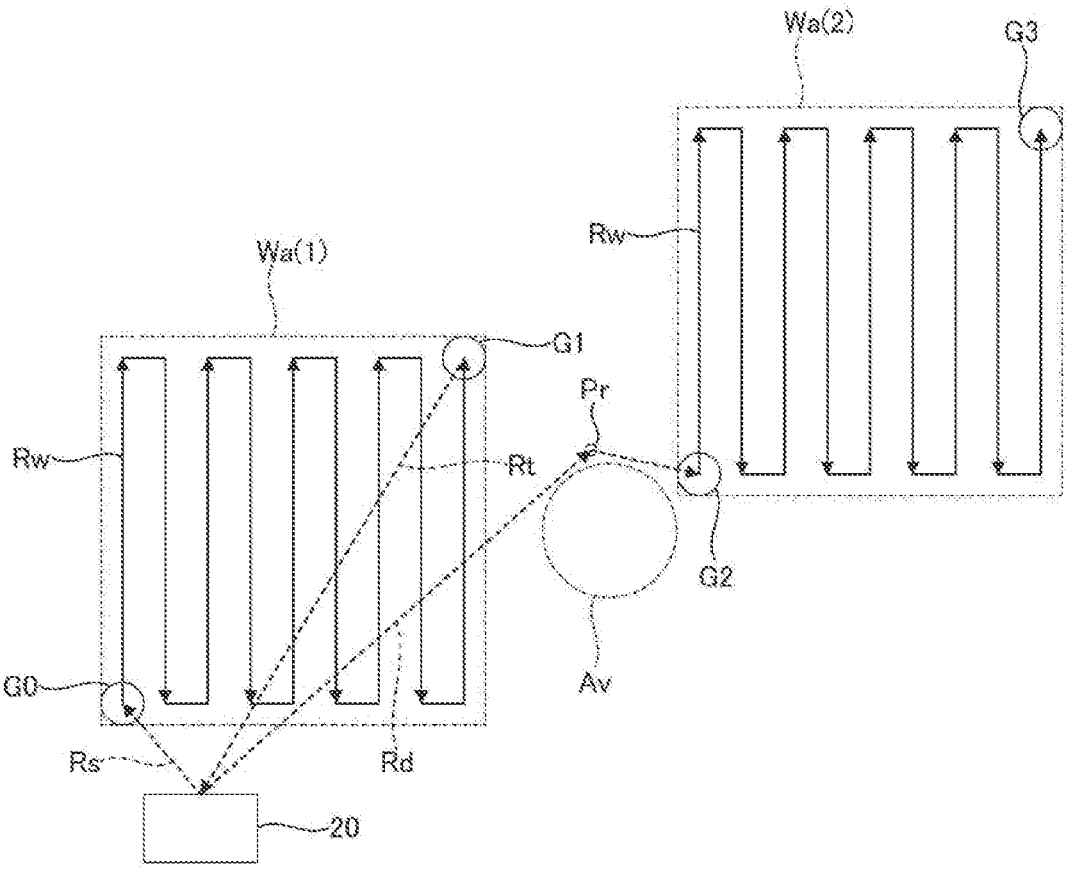
FIG. 7 illustrates an example of the setting of traveling routes by the controller of the robotic working apparatus.

With an example illustrated in FIG. 7, a relay point Pr is provided in the traveling route Rd. As illustrate in FIG. 7, when an avoidance area Av to avoid an obstacle and so forth is set between the base 20 and the work start point G2 in the second area Wa(2), the relay point Pr is set to provide an alternative route to bypass the avoidance area Av. This relay point Pr may be provided between the work end point G1 and the base 20 and/or between the base 20 and the work start point G2, and also provided between the base 20 and the work start point G0 as needed.

There may be a plurality of relay points. For example, when RTK-GNSS (GPS) is adopted, the location accuracy is improved, and therefore when only one relay point is set, the working robot 10 travels and turns intensively at the location of the relay point. This may cause the damage of the field F. To reduce the damage, a plurality of relay points are set, and one of them is randomly selected. By this means, it is possible to prevent the damage of the field F.

Figure 8:
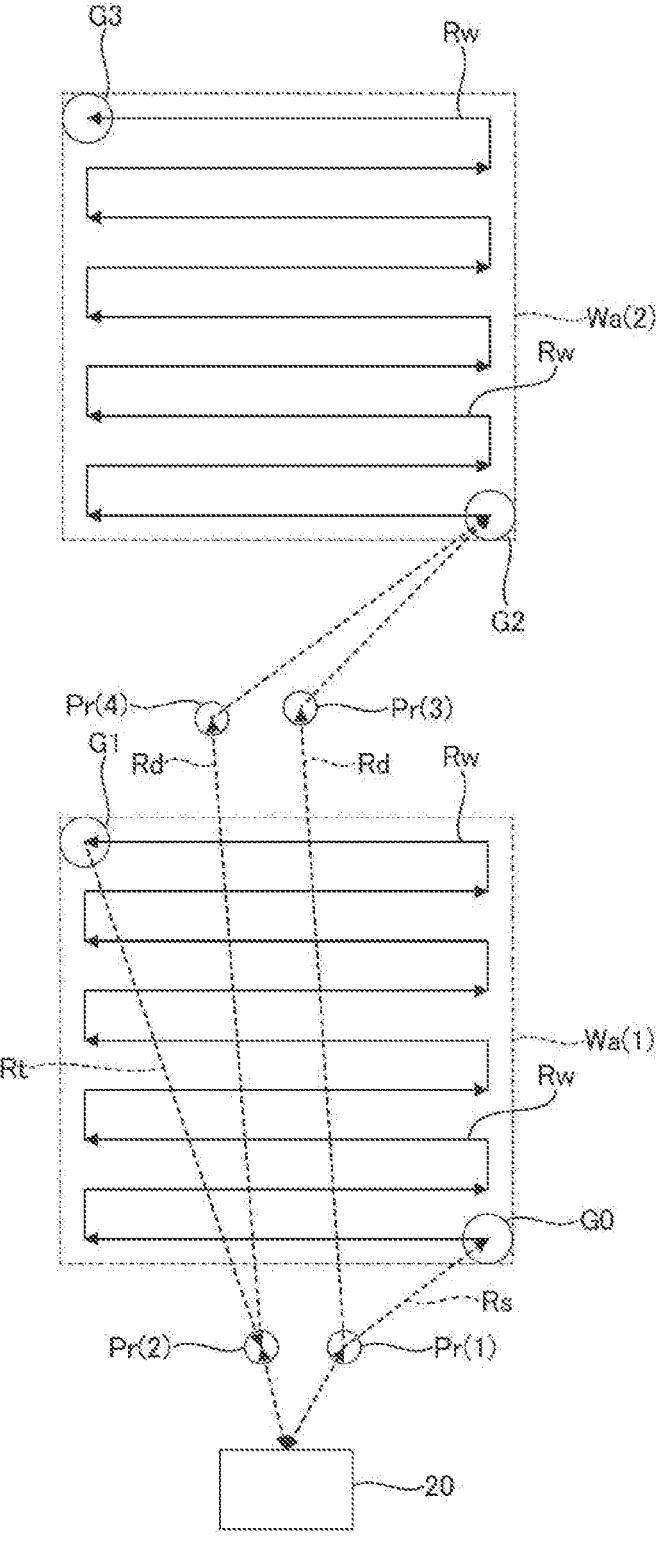
FIG. 8 illustrates an example of the setting of traveling routes by the controller of the robotic working apparatus.

FIG. 8 illustrates an example where a plurality of relay points Pr(1), Pr(2), Pr(3), and Pr(4) are provided. Here, the relay point Pr(1) is provided between the base 20 and the work start point G0 in the first area Wa(1); the relay point Pr(2) is provided between the work end point G1 in the first area Wa(1) and the base 20; and the relay point Pr(3) and the relay point Pr(4) are provided between the base 20 and the work start point G2 in the second area Wa(2). In this way, when the plurality of relay points are provided, these relay points are appropriately selected. By this means, it is possible to optionally set the traveling routes Rs, Rt, and Rd while preventing the overlap of them.

Figure 9A:
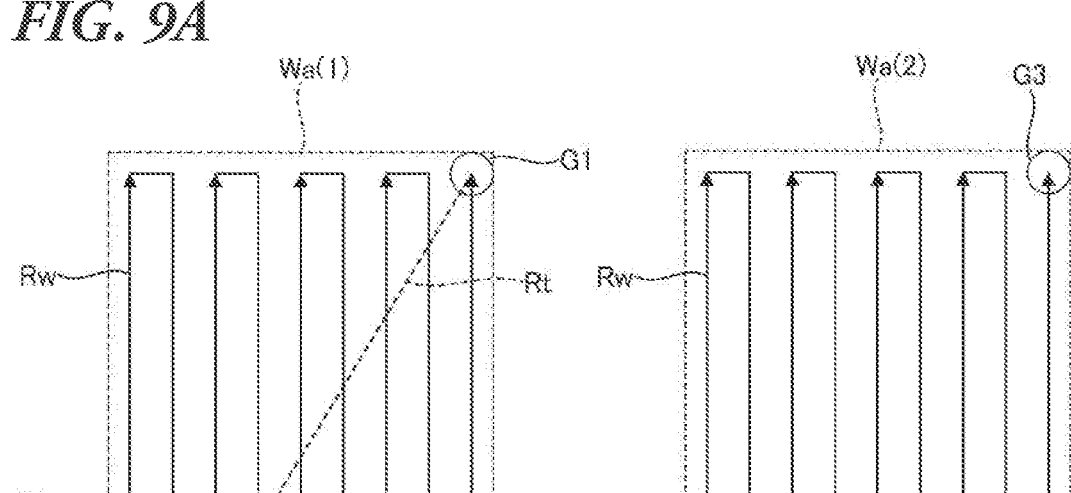
FIG. 9A illustrates an example of the setting of traveling routes by the controller of the robotic working apparatus, which are set last time or several times ago.
Figure 9B:
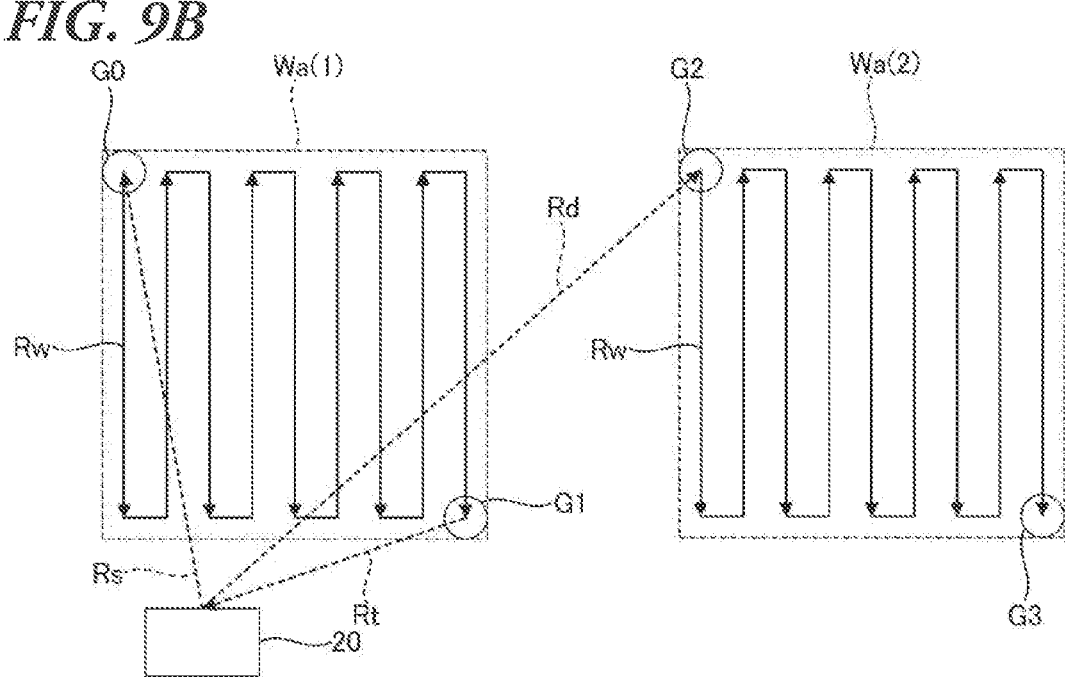
FIG. 9B illustrates an example of the setting of the traveling routes by the controller of the robotic working apparatus, which are set this time.

With an example illustrated in FIGS. 9A and 9B, at least one of the work start point G0 in the first area Wa(1), the work end point G1 in the first area Wa(1), and the work start point G2 in the second area Wa(2) is different from that set in the past.

That is, in a case where the work start point G0 in the first area Wa(1), the work end point G1 in the first area Wa(1), and the work start point G2 in the second area Wa(2) are set as illustrated in FIG. 9A last time or several times ago, the work start point G0 in the first area Wa(1), the work end point G1 in the first area Wa(1), and the work start point G2 in the second area Wa(2) are changed to different points as illustrated in FIG. 9B this time. By this means, it is possible to prevent the traveling routes Rs, Rt, and Rd set this time from overlapping with the traveling routes Rs, Rt, and Rd set last time.

Figure 10A:
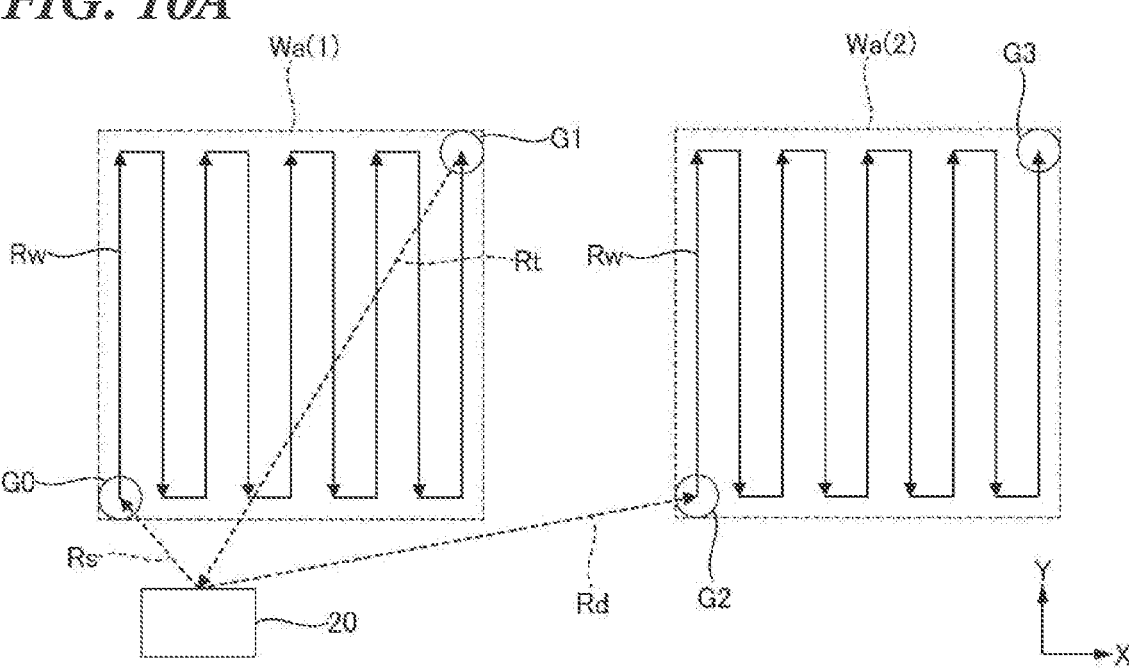
FIG. 10A illustrates an example of the setting of traveling routes by the controller of the robotic working apparatus, which are set last time or several times ago.
Figure 10B:
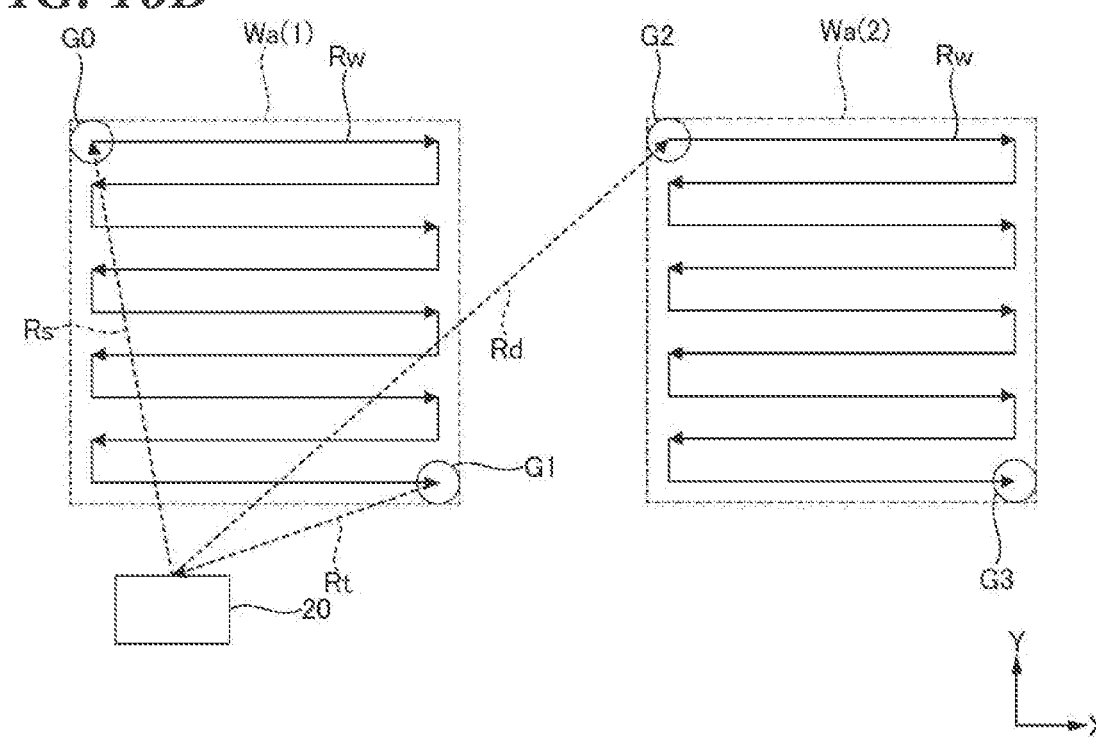
FIG. 10B illustrates an example of the setting of the traveling routes by the controller of the robotic working apparatus, which are set this time.

FIGS. 10A and 10B illustrate an example where the patterned traveling is set for the first area Wa(1) and the second area Wa(2), and the angle of the patterned traveling set this time is changed from the angle of the patterned traveling set in the past.

That is, in a case where the traveling routes Rw in the first area Wa(l) and the second area Wa(2) set last time or several times ago form the patterned traveling in the stripe pattern along Y direction as illustrated in FIG. 10A, the patterned traveling of the traveling routes Rw in the first area Wa(1) and the second area Wa(2) are changed to that in the stripe pattern along X direction as illustrated in FIG. 10B this time. In this way, the angle of the patterned traveling is changed. By this means, it is possible to change the work start point G0 in the first area Wa(1), the work end point G1 in the first area Wa(1), and the work start point G2 in the second area Wa(2) to different points, respectively, and consequently to prevent the traveling routes Rs, Rt, and Rd set this time from overlapping with the traveling routes Rs, Rt, and Rd set last time, respectively. Here, as illustrated in FIG. 10, the angle of the patterned traveling is changed to 90 degrees. However, this is by no means limiting but the angle may be changed by any value.

Figure 11A:
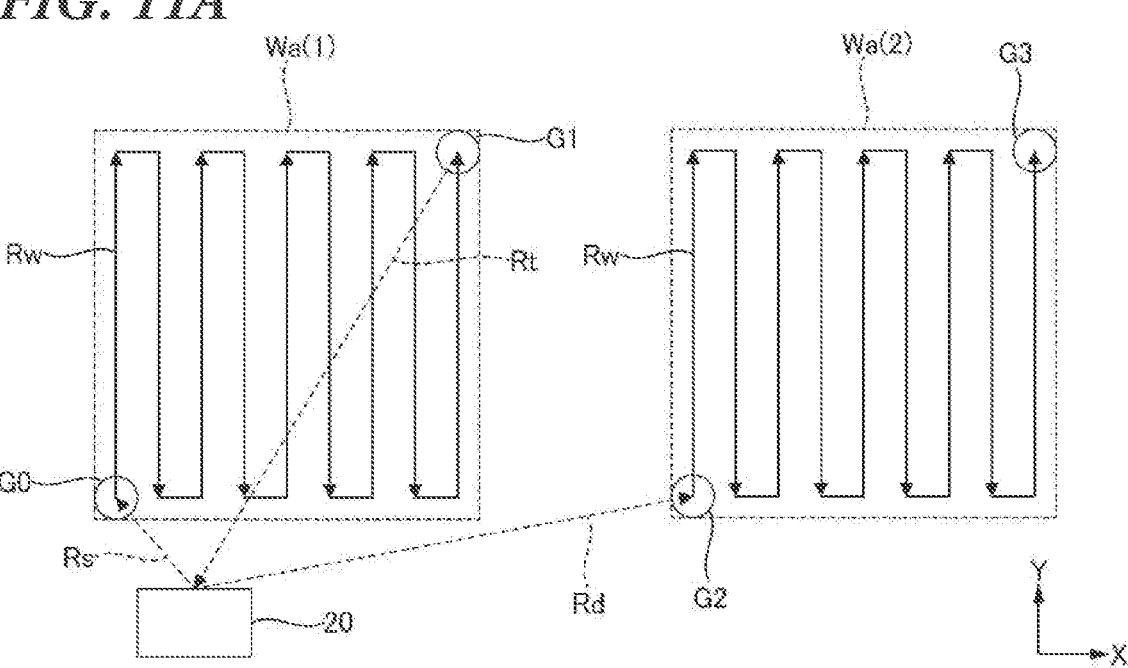
FIG. 11A illustrates an example of the setting of traveling routes by the controller of the robotic working apparatus, which are set last time or several times ago.
Figure 11B:
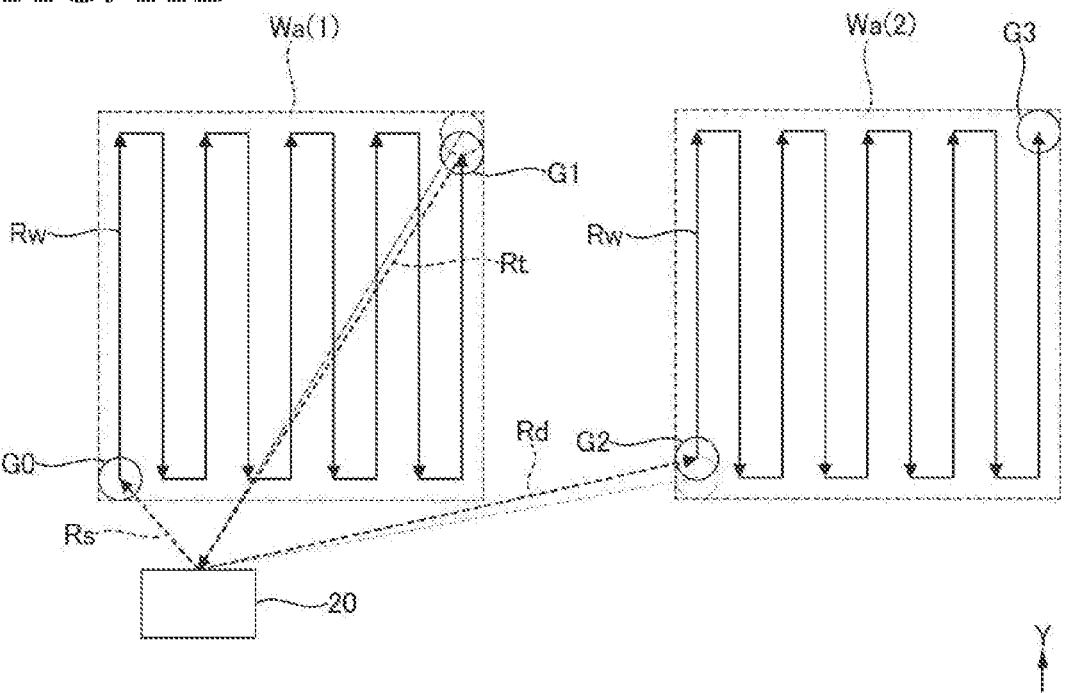
FIG. 11B illustrates an example of the setting of the traveling routes by the controller of the robotic working apparatus, which are set this time.

FIGS. 11A and 11B illustrate an example where the work end point G1 in the first area Wa(1) and the work start point G2 in the second area Wa(2) set this time are shifted from those set in the past, respectively. That is, in a case where the work end point G1 in the first area Wa(1) and the work start point G2 in the second area Wa(2) are set as illustrated in FIG. 11A last time or several times ago, each of the work end point G1 and the work start point G2 is shifted in the Y direction by a predetermined distance as illustrated in FIG. 11B this time. By this means, it is possible to prevent the traveling routes Rt and Rd set this time from overlapping with the traveling routes Rt and Rd set last time, respectively. The shifted points may be the work start point G0 in the first area Wa(1) and the work end point G3 in the second area Wa(2), and any point may be selected. In addition, the direction to shift the point may be the X direction, and any direction may be selected.

Figure 12:
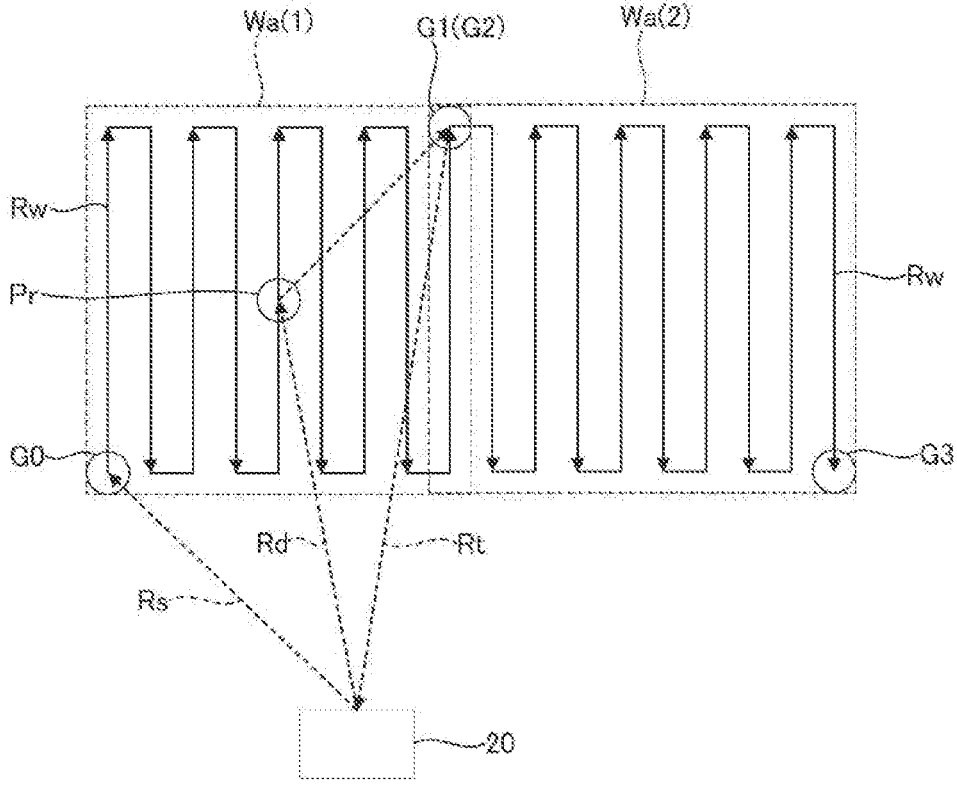
FIG. 12 illustrates an example of the setting of traveling routes by the controller of the robotic working apparatus.

Here, with the examples illustrated in FIG. 6 to FIG. 11B, the work end point G1 in the first area Wa(1) and the work start point G2 in the second area Wa(2) are set to be different from one another. In contrast, as illustrated in FIG. 12, the work end point G1 in the first area Wa(1) and the work start point G2 in the second area Wa(2) may be set to the same point. In this case, the relay point Pr is set as illustrated in FIG. 12, and therefore it is possible to prevent the traveling route Rd from overlapping with the traveling route Rt.

Figure 13:
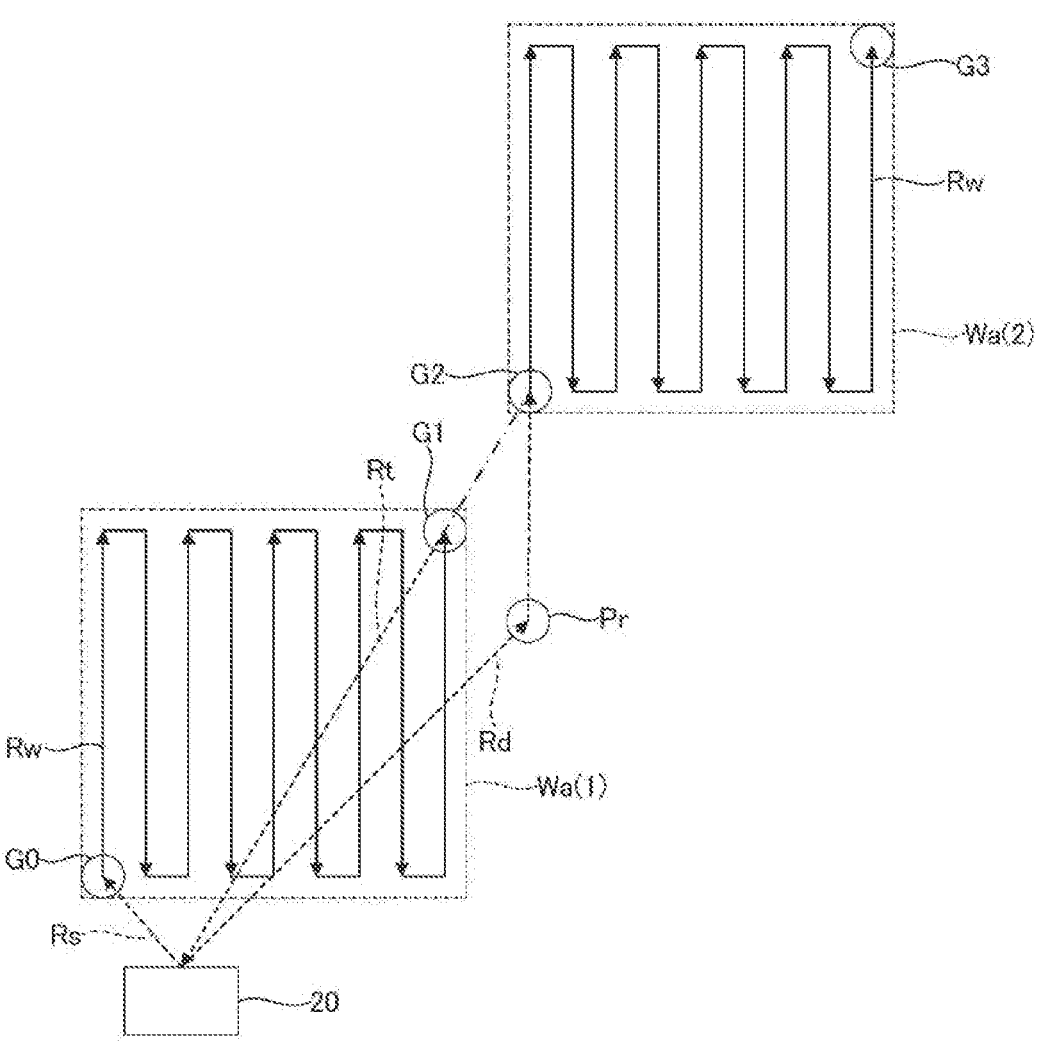
FIG. 13 illustrates an example of the setting of traveling routes by the controller of the robotic working apparatus.

Moreover, as illustrated in FIG. 13, the work end point G1 in the first area Wa(1), the work start point G2 in the second area Wa(2), and the base 20 may be arranged linearly (the work start point G2 is located on the extended line of the line connecting the base 20 to the work end point G1). In this case, the relay point Pr is set as illustrated in FIG. 13, and therefore it is possible to prevent the traveling route Rd from overlapping with the traveling route Rt.

Figure 14:
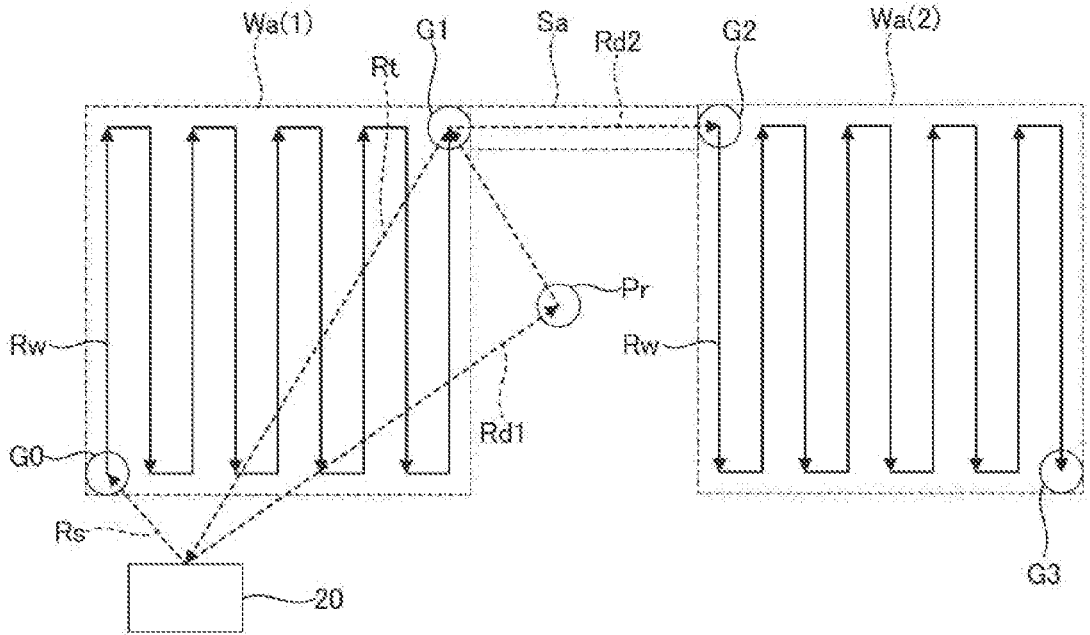
FIG. 14 illustrates an example of the setting of traveling routes by the controller of the robotic working apparatus.

Furthermore, as illustrated in FIG. 14, a space area Sa may be provided between the first area Wa(1) and the second area Wa(2). In this case, when a traveling route Rd2 is set between the work end point G1 in the first area Wa(1) and the work start point G2 in the second area Wa(2), the relay point Pr is set as illustrated in FIG. 14. By this means, it is possible to prevent a traveling route Rd1 from the base 20 to the work end point G1 in the first area Wa(1) via the relay point Pr from overlapping with the traveling route Rt from the work end point G1 to the base 20. In this case, the traveling route from the base 20 to the work start point G2 in the second area Wa(2) is a route obtained by adding the traveling route Rd2 to the traveling route Rd1.

With the above-described embodiment, the working tool 12 of the working robot 10 is actuated and working on the traveling routes Rw in the first area Wa(1) and the second area Wa(2). When the working tool 12 is the blade device 12S, the mowing work is performed along the traveling routes Rw. Meanwhile, when the working tool 12 is the collection device 12P, the collection work to collect the target objects O is performed along the traveling routes Rw.

On the other hand, the working tool 12 does not work on traveling routes Rt and Rd set when the working robot 10 moves from the work end point G1 in the first area Wa(1) to the work start point G2 in the second area Wa(2), or the traveling route Rs from the base 20 to the work start point G0 in the first area Wa(1). By this means, when the working robot 10 travels not for the work, the working tool 12 does not work, and therefore it is possible to prevent wasteful consumption of the battery and also prevent the life of the working tool 12 from being reduced.

As described above, according to the invention, it is possible to reduce the damage of the field by eliminating the overlap of the traveling routes as much as possible, and allow efficient movement between a plurality of areas even taking into account the charging of the battery.

As described above, the embodiments of the present invention have been described in detail with reference to the drawings. However, the specific configuration is not limited to the embodiments, and the design can be changed without departing from the gist of the present invention. In addition, the above-described embodiments can be combined by utilizing each other's technology as long as there is no particular contradiction or problem in the purpose and configuration.

The invention claimed is:

1. A robotic working apparatus comprising:
   a working robot having a working tool configured to perform work on a field, the working robot configured to perform the work using the working tool while autonomously traveling on the field;
   a processor configured to set a traveling route for the working robot and control motion of the working robot; and
   a memory configured to be able to communicate with the processor, wherein:
   a first area and a second area are set on the field as working areas of the working robot, and when the working robot moves from a work end point in the first area to a work start point in the second area, the processor sets a route from the work end point in the first area to a base, and a route from the base to the work start point in the second area;
   the route from the work end point in the first area to the base is different at least in part from the route from the base to the work start point in the second area;
   at least one relay point is selected from a plurality of relay points;

the route between the base and the work start point in the second area includes:

a first straight line from the base to a first said selected relay point or a second selected relay point, and at least a second straight line from the first selected relay point or a third said selected relay point to the work start point in the second area; and/or the route between the work end point in the first area and the base includes:

a third straight line from the work end point in the first area to the first said selected relay point, and a fourth straight line from the first said selected relay point to the base.

2. The robotic working apparatus according to claim 1, wherein the base is a charging base for the working robot.

3. The robotic working apparatus according to claim 1, wherein a relay point is provided between the work end point and the base and/or between the base and the work start point.

4. The robotic working apparatus according to claim 3, wherein a plurality of relay points are provided.

5. The robotic working apparatus according to claim 1, wherein the work end point in the first area and the work start point in the second area are different from one another.

6. The robotic working apparatus according to claim 1, wherein at least one of the work start point in the first area, the work end point in the first area, and the work start point in the second area is set to be different from that set in the past.

7. The robotic working apparatus according to claim 5, wherein patterned traveling is set in the first area and the second area, and an angle of the patterned traveling set this time is changed from an angle of the patterned traveling set in the past.

8. The robotic working apparatus according to claim 1, wherein when the working robot moves from the work end point in the first area to the work start point in the second area, the working tool does not work.

9. The robotic working apparatus according to claim 1, wherein the working tool is a blade device to perform mowing on the field.

10. The robotic working apparatus according to claim 1, wherein the working tool is a collection device configured to collect target objects on the field.

11. The robotic working apparatus according to claim 1, wherein a space area is provided between the first area and the second area.

\* \* \* \* \*